United States Patent
Bruso (12)

(10) Patent No.: US 6,543,963 B2
(45) Date of Patent: Apr. 8, 2003

(54) APPARATUS FOR HIGH-VOLUME IN SITU SOIL REMEDIATION

(76) Inventor: Bruce L. Bruso, R.R. 1 Box 1T E. Mountain Rd., Hegins, PA (US) 17938

( * ) Notice: Subject to any disclaimer, the term of this patent is extended or adjusted under 35 U.S.C. 154(b) by 0 days.

(21) Appl. No.: 09/808,914

(22) Filed: Mar. 15, 2001

(65) Prior Publication Data

US 2002/0012572 A1 Jan. 31, 2002

Related U.S. Application Data

(60) Provisional application No. 60/189,766, filed on Mar. 16, 2000.

(51) Int. Cl.[7] ............................................. B09C 1/00
(52) U.S. Cl. ........................ 405/128.15; 405/128.5; 111/118; 172/554
(58) Field of Search ....................... 172/540, 554; 111/118; 405/128.1, 128.2, 128.25, 128.15, 128.4, 128.45, 128.5, 128.55, 128.6, 128.7, 128.75, 128.8, 128.85; 299/39.2; 404/92, 76

(56) References Cited

U.S. PATENT DOCUMENTS

| | | | | |
|---|---|---|---|---|
| 3,970,012 A | * | 7/1976 | Jones, Sr. ................... | 111/118 |
| 4,150,502 A | * | 4/1979 | Sijthoff ....................... | 172/177 |
| 4,333,686 A | * | 6/1982 | Arnswald ................... | 299/39.6 |
| 4,586,444 A | * | 5/1986 | Thiessen .................... | 111/122 |
| 4,755,001 A | * | 7/1988 | Gilbert ...................... | 299/39.8 |
| 5,242,246 A | | 9/1993 | Manchak, III et al. ..... | 405/128 |
| 5,631,160 A | | 5/1997 | Bruso ........................ | 435/262.5 |
| 5,639,182 A | | 6/1997 | Paris ........................... | 405/128 |
| 5,678,639 A | * | 10/1997 | Golden ........................ | 172/112 |
| 5,776,422 A | * | 7/1998 | Kawasaki .................... | 422/307 |
| 5,824,541 A | | 10/1998 | Horn et al. ............... | 435/262.5 |
| 5,830,752 A | | 11/1998 | Bruso ........................ | 435/283.1 |
| 6,017,169 A | * | 1/2000 | Toor et al. .................. | 111/118 |

OTHER PUBLICATIONS

"The Excavator" From Trencor, vol. 1, No. 1999.
"The World's Leading Manufacturer Of Track Mounted Trenching Equipment", Trencor, Inc. brochure.

* cited by examiner

Primary Examiner—Heather Shackelford
Assistant Examiner—John Kreck
(74) Attorney, Agent, or Firm—Drinker Biddle & Reath LLP

(57) ABSTRACT

An apparatus for high volume in-situ treatment of contaminated soil is a mobile vehicle with a chain trenching tool an excavator drums attached to the idler wheel to extend the width of soil cutting and increase the volume of soil being churned and treated in-situ. The drums may be arranged both for clock-wise and counter clock-wise rotation, and oriented to provide vertical lifting and swirling of the soil. The apparatus may include a hood disposed over the cutting drums to define a remediation chamber with ports for injecting high temperature air or chemical or biological remediation fluid into the soil. In a preferred embodiment, the hood has internal partitions that create a vapor recovery chamber outboard of the drums.

10 Claims, 3 Drawing Sheets

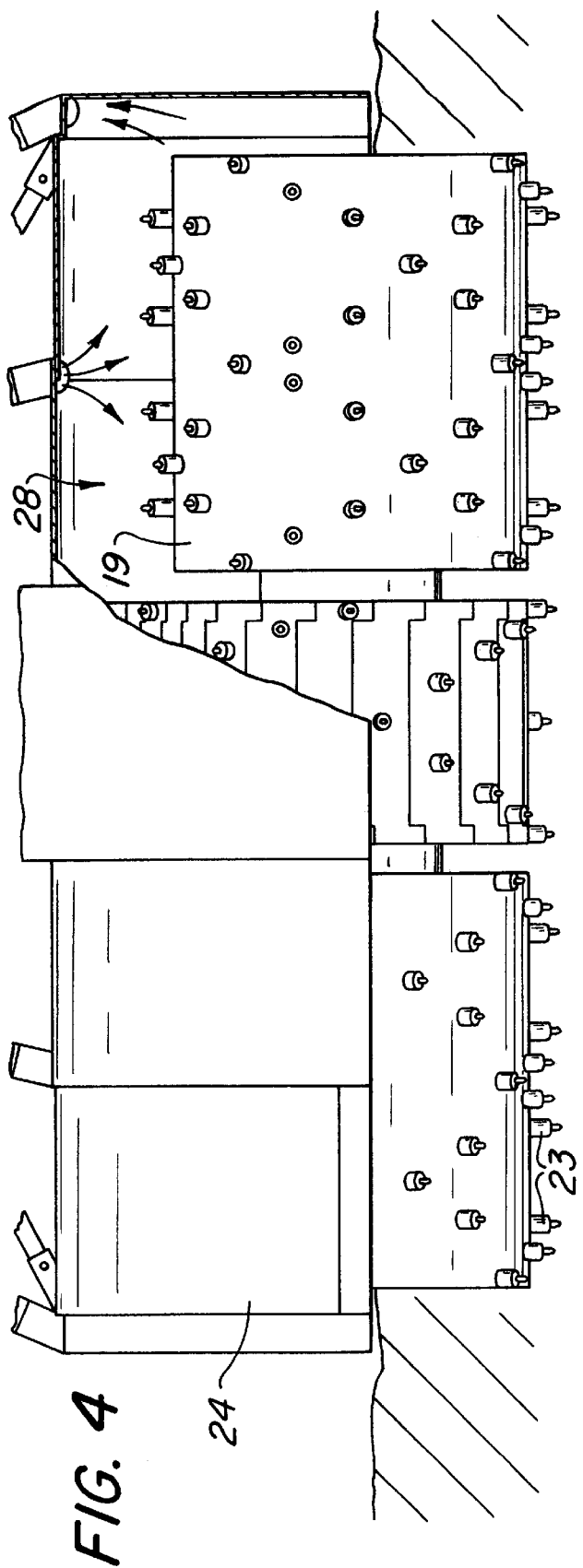
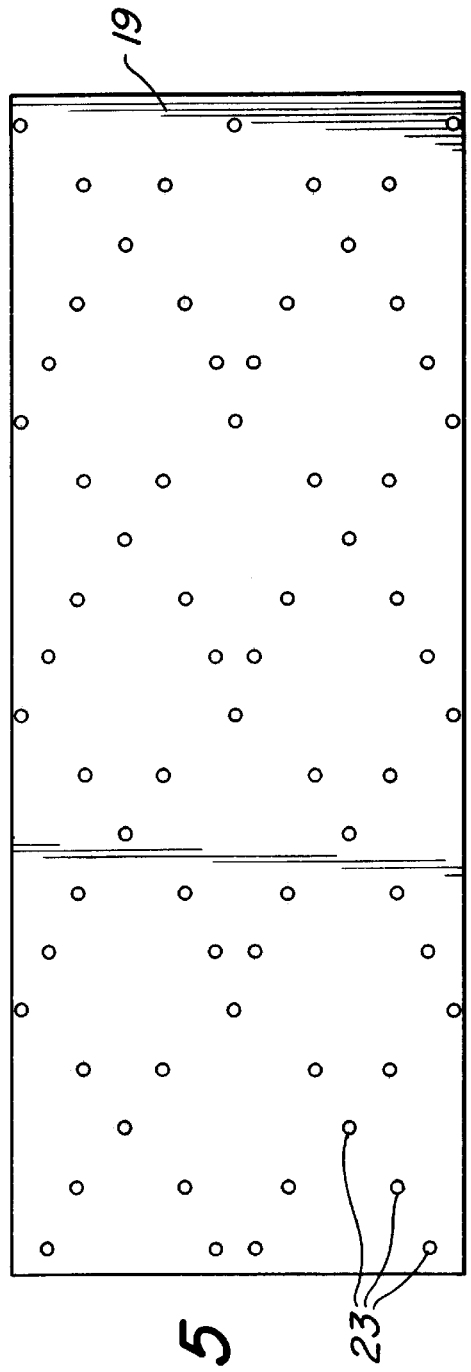
FIG. 4
FIG. 5

APPARATUS FOR HIGH-VOLUME IN SITU SOIL REMEDIATION

CROSS-REFERENCE TO RELATED APPLICATIONS

This application claims a priority filing date based upon United States provisional patent application No. 60/189,766, which was filed on Mar. 16, 2000.

BACKGROUND OF THE INVENTION

1. Field of the Invention

The invention is related to the general field of remediation of contaminated soil, and to the more specific field of devices and methods of remediating soil in situ at a contaminated site.

2. Description of Related Art

U.S. Pat. Nos. 5,631,160 and 5,830,752 issued to this inventor describe an apparatus and methods of in situ soil remediation using a trenching tool. While the trenching tool has proven to be effective, and is in fact preferred for treating contaminated areas in proximity to walls or structures that inhibit maneuvering, and in areas with deep contamination in narrow seams, the inventor has found that it would be desirable in some instances to have an apparatus capable of a higher volume rate of soil treatment. Those instances include large open areas of contaminated soil, such as areas of landfills where contaminated soil rows or lies close to the surface.

SUMMARY OF THE INVENTION

The invention is in an apparatus for high volume in-situ treatment of contaminated soil to extract contaminants. The apparatus is a mobile vehicle, preferably a tractor with a crawler undercarriage, with a boom of the type typically used as a chain trenching tool. Booms of this type house a mechanism for driving a cutting chain. The chain drive mechanism is usually coupled to a mechanical or hydrostatic drive at the head end of the boom, and at the tail end has an idler wheel with sprockets to engage the soil cutting chain. There are commercially available several types of excavator drums that can be attached to the idler wheel or its axle to extend the width of soil cutting far beyond the width of the cutting chain. This invention uses such drums with a width of at least 1 foot each to increase the volume of soil being churned and treated in-situ. The drums are preferably modified from the commercially available configuration to provide soil cutting teeth arranged both for clock-wise and counter clock-wise rotation, and oriented to provide vertical lifting of the soil rather than funneling toward a center conveyor.

In a preferred configuration, the cutting teeth may be oriented at an angle and location such that some of the teeth propel soil across the drums in a direction away from the cutting chain and others of the teeth propel soil across the drums toward the cutting chain. This opposed directions causes the soil to swirl or vortex. In one alternative, the drum having a plurality of discs arising from and concentric with the drum, and teeth are located on the side walls and front rim of the discs.

The invention may include a hood disposed over the cutting drums to define a remediation chamber above the drums. In operation, contaminated soil is churned and broken down and lifted under the hood to release contaminant vapors. The hood may have ports for injecting high temperature air into the soil when it is lifted into the hood to bake out volatile contaminants. The hood may also have nozzles to inject a chemical or biological remediation fluid into the soil. In a preferred embodiment, the hood has internal partitions that confine vapor released from the soil and any remediation fluid in the chamber around the cutting drums, and create a vapor recovery chamber outboard of the drums. A vacuum line into the recovery chambers pulls gases out of the remediation chamber into the recovery chambers and then to a filtration or other disposal device. The vehicle preferably has a hydraulic means to tilt the hood to match the terrain.

BRIEF DESCRIPTION OF THE DRAWINGS

FIG. 4 is a front view of a soil remediation apparatus similar to FIG. 1, having an alternative form of cutting drum.

FIG. 5 is a representation of a cutting drum of the type shown in FIG. 4 as it would appear if the surface of the drum were opened into a flat sheet, to show a pattern and orientation of cutting teeth for clockwise and counterclockwise rotation of the drums.

DESCRIPTION OF PREFERRED EMBODIMENTS

Figure 1:
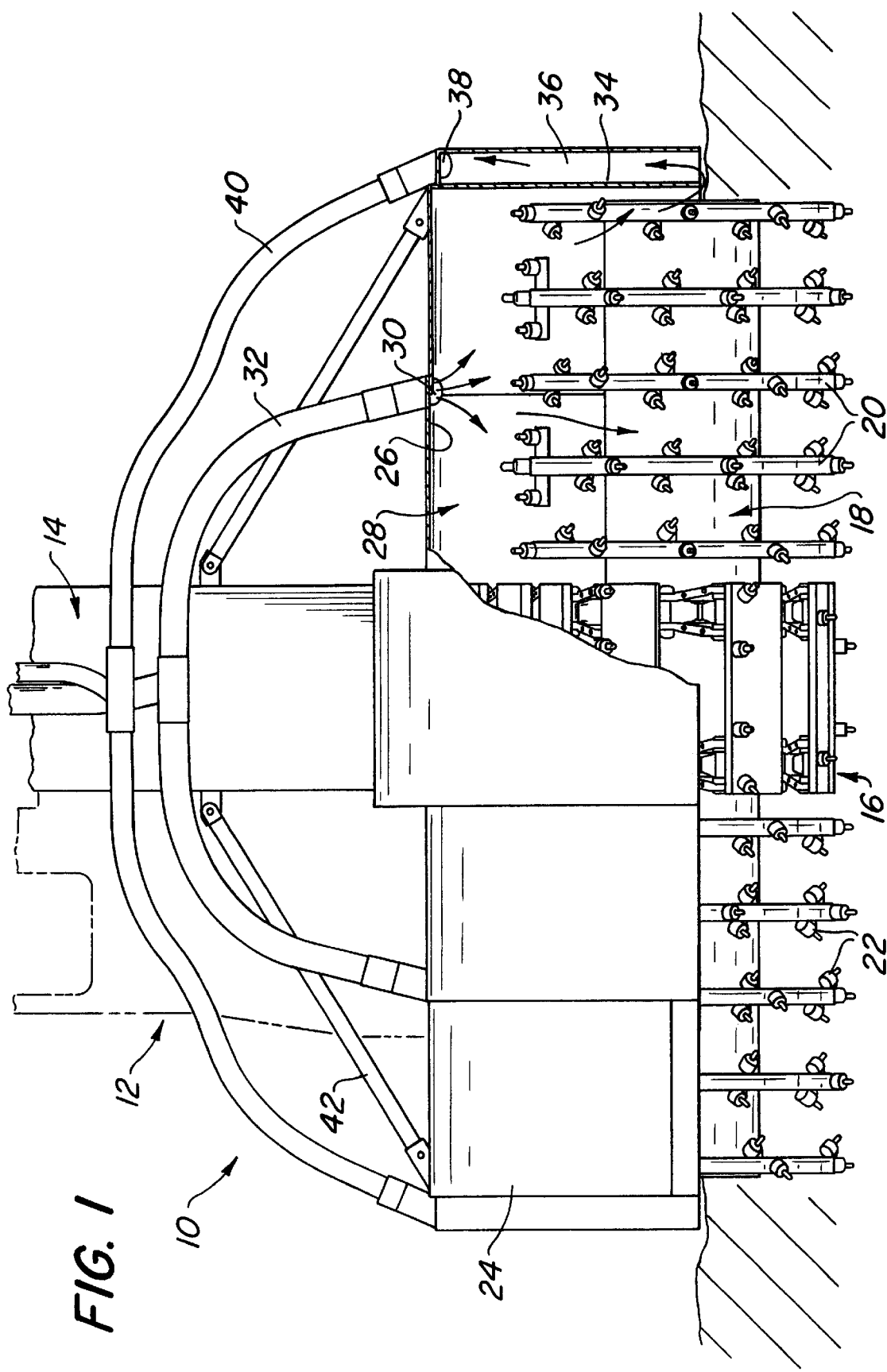
FIG. 1 is a front view of a soil remediation apparatus, wherein the mobile vehicle is represented by phantom outline and the hood covering the soil cutting drums is partially cut away to reveal the interior chambers and ports.

FIG. 1 depicts from a front view an apparatus 10 for treating contaminated soil. The apparatus is a mobile vehicle 12, preferably a crawler-type tractor, although a wheeled tractor could be used. The particular type of vehicle is not significant except as depicted and described hereafter, hence the insignificant portions of the vehicle 12 are represented by a broken line silhouette of the operator cabin. Mounted on the vehicle is a boom 14 of the type commonly used for a chain trencher. The particular model of boom is not significant; most booms of this type have the common features of a head end and a tail end and two opposing lateral sides, and house a drive mechanism for turning a soil cutting chain 16 along a loop path. Although there are many variations of drive mechanisms, they typically have a mechanical or hydraulic power source turning a drive wheel at the head end of the boom and have an idler wheel near the tail end, with the chain running a loop around the two wheels.

Trenching tools have been used for in situ soil remediation, as shown in U.S. Pat. Nos. 5,631,160 and 5,830,752. Running the trencher chain in place, without conveying the soil away as would be done in a actual trenching operation, effectively comminutes packed and dense soil to small particles and lumps. Hot air or a chemical/biological remediation agent can then be introduced to the soil as its is being broken and lifted by the trencher chain to strip off contaminants as vapor or to react contaminants to a less hazardous compound. To increase the volume of soil being churned and lifted for treatment, the apparatus 10 uses excavator drum assemblies 18 that can be attached to the idler wheel or its axle to extend the width of soil cutting far beyond the width of the cutting chain. A drum assembly is disposed on each lateral side of the boom and is operatively connected to the idler wheel to rotate each drum at the same speed as the idler wheel.

There are commercially available excavator drums of various configurations and lengths, such as excavator drums sold by Trencor Inc. under the name RoadMiner and by Vermeer under the name Terrain Leveler. These excavator drums are available in several sizes ranging up to five feet in diameter and five feet long, and can enable a trencher to excavate a trench with width of up to 13.5 feet. The effect of these dimensions is that the trencher can excavate a large volume rate of soil as a wide trench or a roadbed. This invention uses such drums with a length of at least 1 foot, and preferably of about three to seven feet, to increase the volume rate of soil being churned and treated in situ.

There are several types of cutting mechanism available for the drums. One type is a gathering drum to facilitate excavation of soil and rock. On the gathering drum, auger-type blades are arranged in a spiral pattern around the drum directed inward toward a central conveyor at the trencher chain. This type drum is used where there is little requirement to cut rock. For soil with large rock content, the other type of drum has carbide tipped teeth arranged in a V pattern. Both types excavate a trench or a roadbed by propelling the soil and rock particles onto a cental conveyor.

Figure 2:
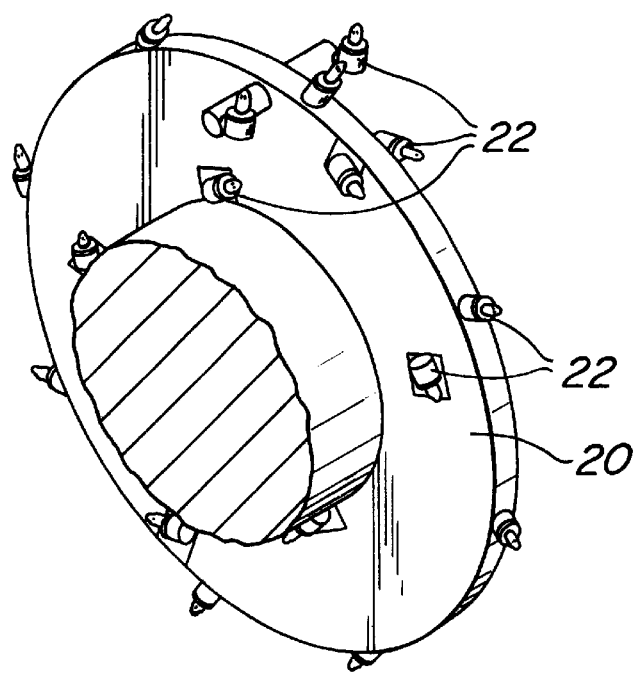
FIG. 2 is a perspective of a section of a soil cutting drum showing a disk and the placement of rotary carbide tip cutting teeth.

For use in soil remediation, the drums are preferably modified from the commercially available excavator configurations to provide rotary carbide cutting tips arranged both for clock-wise and counter clock-wise rotation, and oriented to provide vertical lifting of the soil rather than funneling toward a center conveyor. The cutting drums 18 in FIG. 1 are a custom made arrangement in which circular disks 20 are spaced along the drum. The radius of the drum 18 is less than the distance from the center of the idler wheel to the leading edge of the cutting chain, and the circular disks 20 extend out to approximately the difference in distance, so that the cutting arc of the chain and the disks is about the same. Rotary carbide tip cutting teeth 22 are arranged on the disks and drum as shown in FIGS. 1 and 2. Some of the teeth are located on side walls 21 of the disks and are oriented such that the teeth on one side wall have the tips directed inward toward the cutting chain 16 while the teeth on the opposite side wall have the tips directed inward toward the cutting chain 16. This orientation causes the teeth to propel soil in opposite directions, causing the soil to swirl or vortex. This swirling assists rapid breakup of the soil and promotes mixing with air or reagents. Other teeth on the front rim of the drum are oriented directly with the disk to cut into the soil and rock.

Another configuration of drum, as shown in FIG. 4, has a different drum assembly. This type of drum 19 has a radius approximately the same or slightly less than to the distance from the center of the idler wheel to the leading edge of the cutting chain, so that the cutting arc of the chain and the drum is about the same. The commercial versions of this type of drum can have the auger-type blades described earlier or some form of cutting mechanism, such as rotary carbide tip teeth arranged in a "V" pattern. In a preferred form of the invention using this type of drum, carbide tipped cutting teeth 23 would be arranged on the drums 19 in a crisscrossing pattern as shown in FIGS. 4 and 5, and one set of teeth would be facing in a direction to cut during clockwise rotation and another set facing in a direction to cut during counterclockwise rotation. The teeth in both sets may being arranged at an angle such that some of the teeth propel soil across the drum in a direction away from the cutting chain and others of the teeth propel soil across the drum in a toward the cutting chain.

Referring again to FIGS. 1 and 4, the drums and front end of the cutting chain are covered by a hood 24 disposed over both drum assemblies and the chain. The hood 24 has walls 26 that enclose the trencher chain and excavator drums and define a remediation chamber 28 above and around the drum assemblies. Contaminated soil that is broken by the cutting teeth and churned and lifted under the hood may release vapors, including contaminant vapors, under the hood, particularly when heating is used to strip volatile contaminants.

As shown in FIG. 1, there is sufficient head space between the top of the chamber and the rotating drums to create a mixing area in the remediation chamber 28. Soil engaged by the cutting teeth is broken-up and lifted inside the remediation chamber and then falls back into the pit to be lifted and broken repeatedly. The result of this churning action is that the soil becomes broken and mixed in place, soil density is reduced, and the surface area of the soil is increased to allow effective distribution of hot air or other remediation reagents and the release of vapor from the soil.

The remediation chamber 28 has injection nozzles 30 to inject a remediation fluid, such as forced hot air for thermal stripping or a chemical reagent for a chemical reaction such as oxidation. The nozzles are connected through delivery lines 32 to a fluid supply system, and can inject the remediation fluid into the soil as it is being broken and mixed by the drums and chain. The churning of the soil under the hood and against the inner hood contribute to soil density breakdown and uniform mixing with any reagents.

The hood 24 extends outboard of the drums and has an inner partition wall 34 at each side that defines a vacuum recovery chamber 36 on both sides of the remediation chamber. The partition wall 34 does not extend as far down as the walls 26 of the hood, so that vapor can flow from the remediation chamber under the partition walls and into the recovery chambers. The hood has a port 38 passing through the hood at each end into the recovery chambers. The ports 38 are connected by lines 40 to a vacuum system to collect vapor from under the hood and draw it through a filtering system. Thus, if contaminants or their reaction products are released from the soil in vaporous state, they will pass into the recovery chamber and be removed through the ports into the vacuum recovery system. The hood may also have a flexible skirting along its bottom opening to form a barrier with the ground.

Figure 3:
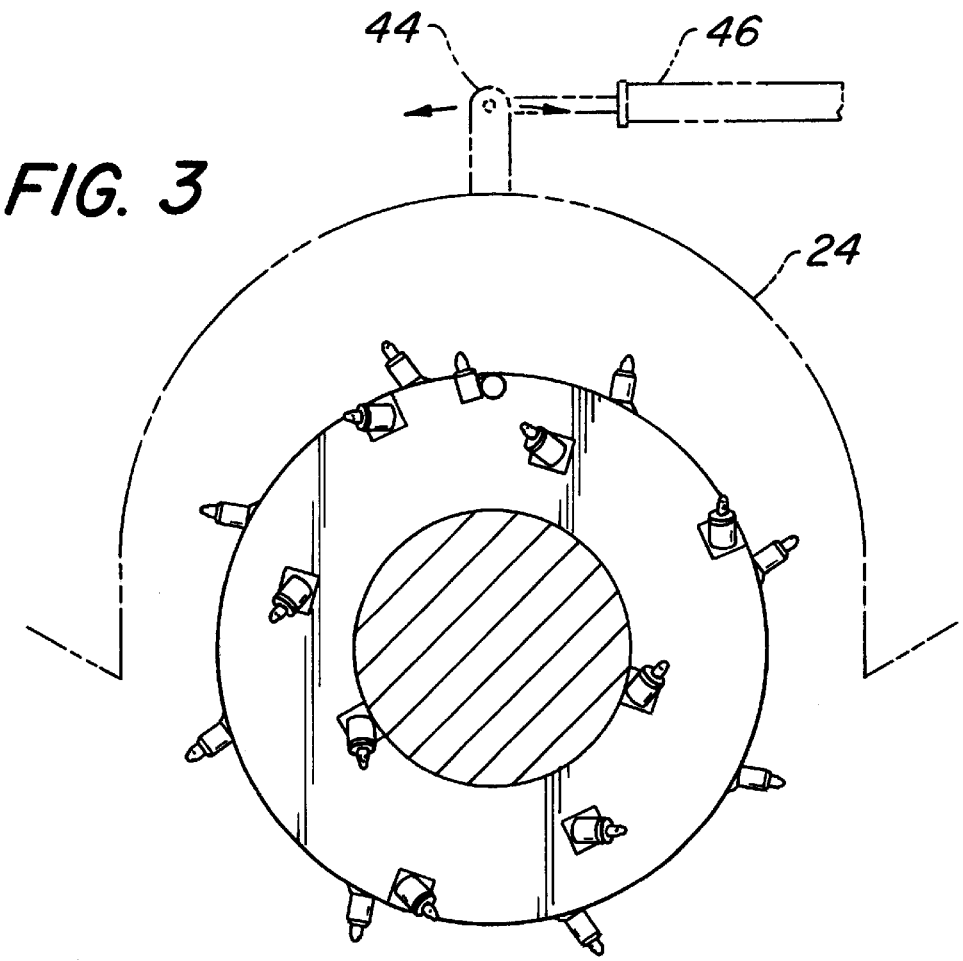
FIG. 3 is a side view of a section of a soil cutting drum and a representation of a hydraulic ram to tilt the hood over the drums for clockwise and counterclockwise rotation of the drums.

The hood 24 may be attached in any suitable manner to the boom 14 or to a structural support of boom, such as by detachable support arms 42. The detachable arms allow the hood to be removed when the remediation process does not release hazardous vapor. The attachment causes the hood to lower and raise along with the boom. As shown in FIG. 3, however, the hood may preferably have a hinged attachment 44 to the support arms and a short hydraulic or pneumatic ram 46 to tilt the hood slightly in the direction of vehicle movement, such that bottom edge of the hood can be slightly raised in the direction of movement and slightly lowered in back of the direction of movement. The tilt adjustment can be made when the direction of vehicle movement is reversed.

Preferably the drive mechanism for the chain permits bi-directional rotation, either by a two-way gearbox in a mechanical drive or by a reversible hydraulic motor. It would also be preferable to have a multi-speed transmission with torque converter to give low chain speed with high torque when needed for cutting through rock. The device can be used moving in one direction and with a chain rotation (normal clockwise rotation) with high torque and in the normal cutting orientation of the teeth to break up rocks in the soil, and then have the rotation reversed for a pass in the opposite direction to churn and mix the broken up soil and rock particles. The reverse direction, the carbide tips of the teeth would not be in the cutting orientation; the butt of the sockets in which the rotary teeth are retained would suffice to churn and lift the soil into the hood.

Alternatively, the cutting teeth may be arranged to cut equally well in either direction, such as the teeth orientation in FIG. 5.

In use, the vehicle would process a large volume rate of soil as compared to using a chain trencher alone. The vehicle is positioned on a grid of contaminated soil and the chain is started to rotate. The boom is lowered to the ground and the chain and drums dig in until the boom is resting on the surface. The hood may be adjusted by a hydraulic ram to tilt slightly upward toward the vehicle. The vehicle then moves backward at a slow progression, such as remaining motionless for three to five minutes and then moving 24 to 36 inches backward and stopping again. During this time the soil in the area of the chain and drums is repeatedly churned and broken and lifted under the hood. High temperature air is injected into the soil as it is lifted under the hood. Alternatively, a chemical or biological agent may be sprayed into the soil.

When the vehicle has made a pass over the soil as described above, the hood can be repositioned to tilt slightly upward away from the vehicle, the chain rotation reversed, and the vehicle can move forward at a similar slow progression to treat the soil again. In the second pass a different remediation fluid can be injected, such as using hot air on the initial pass and spraying a chemical oxidizing agent into the hood on second pass. During both passes, the vapor released from the soil is extracted through the vacuum recovery lines and are filtered to remove contaminants.

I claim:

1. An apparatus for remediating contaminated soil, comprising
    a mobile vehicle mounted thereon a boom having a head end and a tail end and two opposing lateral sides, the boom housing a drive mechanism for turning a soil cutting chain along a loop path, the drive mechanism having a rotating idler wheel near the tail end of the boom and disposed between the opposing lateral sides of the boom;
    a pair of soil cutting drum assemblies, one such drum assembly disposed on each lateral side of the boom and operatively connected to the idler wheel to rotate each drum at the same speed as the idler wheel, each drum having a width dimension of at least one foot, each drum assembly carrying a plurality of soil cutting teeth; and
    a hood disposed over the cutting drum assemblies, the hood defining a remediation chamber above the drum assemblies wherein soil churned by the drum assemblies may release vapors including contaminants under the hood; and
    a vapor recovery system for extracting vapors including contaminants from the hood, wherein the hood has internal partitions defining at least one vapor recovery chamber outboard of the remediation chamber, and the vapor recovery system extracts vapors from the recovery chamber.

2. An apparatus as in claim 1, further comprising:
    each drum having a width dimension of between three and seven foot.

3. An apparatus as in claim 1, further comprising the drive mechanism having the capability of selectively rotating the drums in either clock-wise or counter clock-wise rotation.

4. An apparatus as claim 3, further comprising each drum having a plurality of soil cutting teeth, one set of the cutting teeth being oriented for cutting soil when the drum is rotated clock-wise and another other set of cutting teeth oriented for cutting soil when the drum is rotated counter clock-wise.

5. An apparatus as in claim 1, further comprising each drum having a plurality of soil cutting teeth oriented to lift soil vertically into the hood.

6. An apparatus as in claim 1 further comprising the hood having internal partitions defining two vapor recovery chambers, each chamber being located outboard of the remediation chamber on opposite sides of the remediation chamber, and the vapor recovery system extracts vapors from both recovery chambers.

7. An apparatus as in claim 1, further comprising means for injecting a soil remediation agent into the hood.

8. An apparatus as in claim 1, wherein the teeth are arranged in a pattern and orientation such that some of the teeth propel across the drum in a direction away from the cutting chain and others of the teeth propel across the drum toward the cutting chain.

9. An apparatus as in claim 8, further comprising the drum having a plurality of disks arising from and concentric with the drum, and wherein at least some of the teeth are located on the disks.

10. An apparatus as in claim 8, further comprising the drum having a plurality of disks arising from and concentric with the drum, the disks having side walls, and at least some of the teeth are located on side walls of the disks.

* * * * *